Feb. 20, 1962 S. FIALKOFF 3,022,230
PROCESS FOR ELECTROFORMING GROOVED AND CHANNELED BODIES
Filed June 16, 1959
FIG. 1
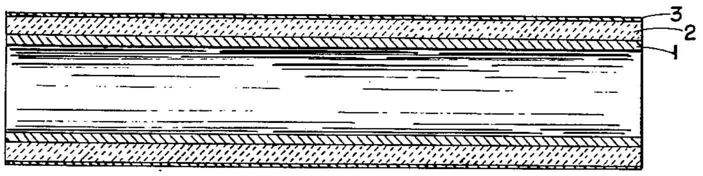
FIG. 2
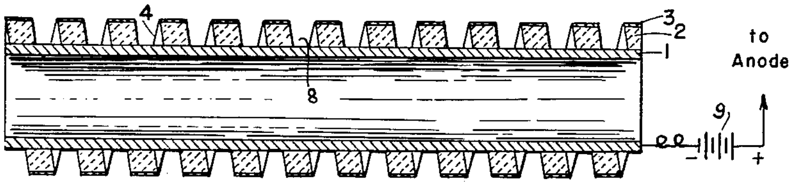
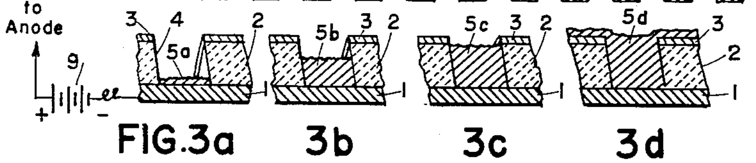
FIG. 3a 3b 3c 3d
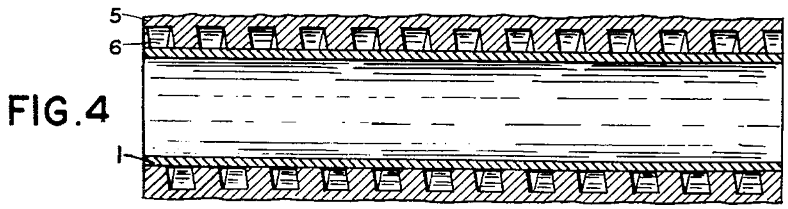
FIG. 5
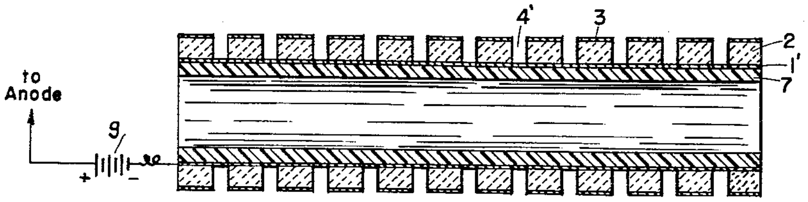
FIG. 6
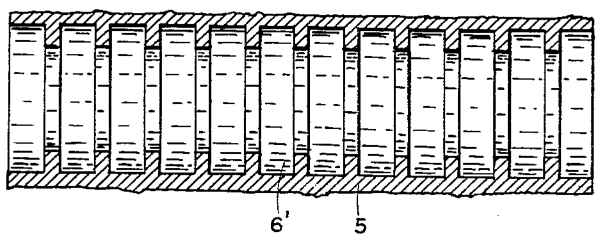
Samuel Fialkoff
*INVENTOR.*
*BY* [signature]
AGENT.

United States Patent Office 3,022,230
Patented Feb. 20, 1962

3,022,230
PROCESS FOR ELECTROFORMING GROOVED AND CHANNELED BODIES

Samuel Fialkoff, Roslyn, N.Y., assignor to Camin Laboratories, Inc., Brooklyn, N.Y., a corporation of New York Filed June 16, 1959, Ser. No. 820,785
8 Claims. (Cl. 204—9)

My present invention relates to the production of grooved and channeled metal bodies and, more particularly, to a process for electroforming such bodies as are used for microwave guides, gas turbines, heat-transfer units and the like.

In my Patent No. 2,889,258, issued June 2, 1959, I disclose a method of electroforming hollow bodies of non-uniform wall thickness, such as wave guides for use in the calorimetric determination of microwave power, which involves the steps of depositing a metallic layer on a mandrel, masking a portion of that layer with a non-conductor, and then continuing to deposit metal on the unmasked portions. In this manner, any desired number of cavities may be obtained. This process requires two electrodeposition stages in order to produce grooved or channeled bodies.

An object of my present invention is, therefore, to provide a process for producing bodies having one or more channels or grooves in a single plating operation which does not require the withdrawal of the body from the plating bath until the completion of the electroforming step.

A more specific object of the invention is to provide a process for producing internally grooved bodies in a high state of finish requiring no internal machining.

A still more specific object of my invention is to provide a process for accurately producing internally channeled or grooved metallic bodies without the use of expensive contoured mandrels.

In accordance with the invention I proceed initially by covering a portion of a conductive mandrel with a non-conducting masking agent or resist (e.g. a wax), covering this non-conducting layer with a conductive coating, cathodizing the conductive mandrel and electrodepositing, in the usual manner, a metallic layer upon the exposed portions of the conductive mandrel. It will be apparent that the electrodeposition occurs only at the mandrel surface; there will be no plating on the conductive coating applied to the resist, since it has not been rendered cathodic. Electrodeposition will thus be restricted by the resist to the unmasked portion of the mandrel until the deposit reaches the conductive coating. At this point, electrical contact having been made through the metallic deposit between the conductive coating and the cathodized mandrel, electrodeposition occurs both on top of the masking agent covered by the conductive coating and at the intervening locations previously built up. When the electroformed metal is deposited in the required thickness, the finished metallic body with its sub-surface passages may be removed from the bath and the masking agent as well as the mandrel removed by methods known per se.

According to a more specific feature of this invention, the wax or other masking agent is initially applied over the entire mandrel surface and is then covered (e.g. by spraying) with the conductive layer which may be of monomolecular thickness. Both the layer and the masking agent are then scraped off or otherwise removed from selected portions of the mandrel to expose, for example, a helical channel. This procedure insures that the sides of the channel are free from traces of conductive material which would establish premature galvanic contact between the cathodically connected mandrel and the conductive layer.

The above and other objects, features and advantages will become more fully apparent from the following description, reference being made to the accompanying drawing in which:

FIG. 1 is a cross-sectional view of a mandrel after completion of the masking step;

FIG. 2 is a cross-sectional view of the mandrel prior to electrodeposition thereon;

FIGS. 3*a*, 3*b*, 3*c*, 3*d* are detail views illustrating further stages of operation and showing, in section, the progressively built-up metallic coating;

FIG. 4 is a cross-sectional view of the mandrel after removal of the masking agent;

FIG. 5 is a cross-sectional view of another embodiment of my invention prior to electrodeposition thereon; and FIG. 6 is a cross-sectional view of the embodiment of FIG. 5 with the mandrel and the masking agent stripped from the electroformed body.

The mandrel 1 of FIGS. 1–4 is a metallic cylinder about which it is desired to electroform a helical channel. I initially coat mandrel 1 with a masking agent 2 such as wax by either spraying or immersion procedures known per se. Upon the masking agent 2 I place a conductive layer 3 of conducting material (e.g. graphite or metal suspended in a solvent) preferably by spraying. By a suitable machining process the masking layer 2 and the conductive layer 3 are selectively removed from the mandrel to produce a helical groove 4 thereon. Groove 4 extends in depth to the mandrel 1, exposing a surface 8 thereof (FIG. 2). Mandrel 1 is cathodized by being connected to the negative pole of a direct-current source, schematically shown as battery 9, and placed in a plating bath where electrodeposition commences. This electrodeposition initially occurs on mandrel 1 at surface 8, growing progressively (*5a*–*5d*, FIGS. 3*a*–3*d*) only in the groove 4. When the deposit *5d* (FIG. 3*d*) electrically contacts the conductive layer 3, thus cathodizing it with respect to the anode (not shown) electrodeposition of the metal occurs upon layer 3 as well as upon the mandrel 1 as the portions of coating 5 coalesce into a tubular body of the desired wall thickness. Upon withdrawal of this body from the electrolyte, the masking agent 2 may be melted or otherwise removed, thus leaving a helical channel 6 surrounded by the metallic coating 5 and the mandrel 1. The subsurface channel 6 is adapted to accommodate various inserts (e.g. electrical conductors) or to be traversed by fluids if it is desired to use the body thus produced as a heat exchanger. It should be noted that for efficient heat exchange the mandrel 1 may be a thin silver or copper cylinder. It will be further apparent that conductive layer 3 ought to be as thin as is compatible with satisfactory conductivity, its thickness being preferably a small fraction of the ultimate thickness of coating 5 above that layer.

Mandrel 1 may be stripped from the electroformed body by dissolution, vaporization or other means known per se if it is desired to produce helical grooves such as are suitable for use as lead-screw-follower nuts.

In the modification illustrated in FIGS. 5 and 6 I produce an annularly grooved body suitable for use as a wave guide (FIG. 6) having grooves 6′, by electrodepositing a metal 5 on a plastic mandrel 7 provided with a conductive foil 1′ cathodized by being connected to the negative terminal of direct-current source 9, the foil being partially masked by a non-conductor 2 covered with a conductive coating 3. Again, the grooves 4′ fill up with electrodeposited metal 5 before the regions covered with conductive coating 3 are connected to cathode potential so that plating thereof may commence. Mandrel 7 is easily extracted from the body thus electroformed, and the foil 1′ may likewise be dissolved or otherwise removed, thus resulting in a highly finished annularly grooved body (FIG. 6).

It will be seen that I have provided a process which is useful in the production of an entire new class of electroformed articles having integrally formed internal cavities for the purposes described or for such other uses as may be desired from time to time. By way of example I may mention not only conventional heat exchangers but also related elements of nuclear reactors wherein a moderator such as heavy water is circulated in helical channel 6 (FIGS. 1–4) while the material which it is desired to subject to a neutron flux is inserted into cylinder 1, the entire electroformed body being insertable in a nuclear-pile moderator channel.

I claim:

1. A process for producing a metallic body having a passage below its surface, comprising thhe steps of applying a non-conductive masking agent to a selected area of a conductive support, covering said masking agent with a conductive layer insulated from said support by said masking agent, cathodically connecting said support in an electroplating circuit, electrolytically depositing a metallic coating on exposed surface portions of the support thus connected, continuing the buildup of said coating beyond a point at which it conductively contacts said layer whereby a portion of said coating will extend over said layer, and removing said masking agent.

2. A process according to claim 1 wherein said coating is built up above said layer to a thickness substantially in excess of the layer thickness.

3. A process according to claim 1, comprising the further step of removing said support from said coating, thereby exposing a sub-surface passage previously occupied by said masking agent.

4. A process for producing a tubular metallic body having an internal passage, comprising the steps of applying a nonconductive masking agent to a selected area on a generally cylindrical conductive mandrel, covering said masking agent with a continuous conductive layer out of contact with said mandrel, cathodically connecting said mandrel in an electroplating circuit, electrolytically depositing a metallic coating on exposed surface portions of the mandrel thus connected, continuing the buildup of said coating beyond a point at which it conductively contacts said layer whereby said coating will partially extend over said layer and coalesce into a tubular body, and removing said masking agent from said body.

5. A process according to claim 4, comprising the further step of extracting said mandrel from said body.

6. A process for producing a metallic body having a passage below its surface, comprising the steps of applying a non-conductive masking agent as a covering layer to a surface of a conductive support, topping said covering layer with a conductive layer, exposing a selected area of said support by removing a portion of both of said layers while maintaining said conductive layer insulated from said support, cathodically connecting said support in an electroplating circuit, electrolytically depositing a metallic coating on the exposed area of the support thus connected, continuing the buildup of said coating beyond a point at which it completes the circuit to said conductive layer whereby a portion of said coating will extend over both of said layers, and removing said masking agent.

7. A process according to claim 6 wherein said masking agent is initially applied as a layer of substantially uniform thickness.

8. A process for producing a tubular metallic body having an internal channel, comprising the steps of applying a nonconductive masking agent as a covering layer of substantially uniform thickness to the outer surface of a generally cylindrical conductive mandrel, applying a conductive layer to the outer surface of said covering layer, cutting a groove into both of said layers down to the level of said mandrel while maintaining said conductive layer insulated from the mandrel surface, cathodically connecting said mandrel in an electroplating circuit, electrolytically depositing a metallic coating on said mandrel surface within said groove, continuing the electrolytic deposition of metal beyond a point at which said coating reaches said conductive layer whereby the latter will be covered by the deposited metal, and removing said masking agent from the resulting body of deposited metal.

References Cited in the file of this patent

UNITED STATES PATENTS

| | | |
|---|---|---|
| 1,063,417 | Cook | June 3, 1913 |
| 1,847,653 | Jones | Mar. 1, 1932 |
| 2,641,439 | Williams | June 9, 1953 |
| 2,728,693 | Cado | Dec. 27, 1945 |
| 2,761,828 | Eldredgo et al. | Sept. 4, 1956 |
| 2,865,821 | Jonke et al. | Dec. 23, 1958 |
| 2,889,258 | Fialkoff | June 2, 1959 |
| 2,898,273 | La Forge et al. | Aug. 4, 1959 |

FOREIGN PATENTS

| | | |
|---|---|---|
| 20,896 | Great Britain | of 1904 |